(12) United States Patent
Chakraborty et al.

(10) Patent No.: US 10,636,057 B2
(45) Date of Patent: Apr. 28, 2020

(54) METHOD AND APPARATUS FOR DYNAMICALLY SELECTING CONTENT FOR ONLINE VISITORS

(71) Applicant: [24]7.ai, Inc., San Jose, CA (US)

(72) Inventors: Abir Chakraborty, Bangalore (IN); Prashant Joshi, Bangalore (IN)

(73) Assignee: [24]7.ai, Inc., San Jose, CA (US)

(*) Notice: Subject to any disclaimer, the term of this patent is extended or adjusted under 35 U.S.C. 154(b) by 437 days.

(21) Appl. No.: 15/346,679

(22) Filed: Nov. 8, 2016

(65) Prior Publication Data

US 2017/0140428 A1    May 18, 2017

Related U.S. Application Data

(60) Provisional application No. 62/255,252, filed on Nov. 13, 2015.

(51) Int. Cl.
*G06Q 30/02*    (2012.01)
*H04L 29/08*    (2006.01)

(52) U.S. Cl.
CPC ..... *G06Q 30/0255* (2013.01); *G06Q 30/0269* (2013.01); *G06Q 30/0277* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 2010/0083318 A1 | 4/2010 | Weare et al. | |
| 2010/0161385 A1 | 6/2010 | Karypis et al. | |
| 2011/0213655 A1* | 9/2011 | Henkin | G06Q 30/0251 705/14.49 |
| 2013/0024492 A1 | 1/2013 | Graff et al. | |
| 2013/0060772 A1* | 3/2013 | Clark | G06Q 10/06 707/736 |
| 2015/0142584 A1 | 5/2015 | Liu et al. | |
| 2015/0169744 A1* | 6/2015 | Walkingshaw | G06Q 30/0251 707/738 |

FOREIGN PATENT DOCUMENTS

EP    2 813 990    12/2014

OTHER PUBLICATIONS

Jaeger H. and Haas H. (2004) Harnessing nonlinearity: Predicting chaotic systems and saving energy in wireless communication. Science, Apr. 2, 2004: vol. 304: pp. 78-80 (Year: 2004).*

* cited by examiner

*Primary Examiner* — Michael J Sittner
(74) *Attorney, Agent, or Firm* — Perkins Coie LLP; Lena Petrovic

(57) ABSTRACT

A computer-implemented method and an apparatus dynamically select content for online visitors. The method includes receiving information related to activity of an online visitor on an enterprise interaction channel and identifying channel data related to the activity. A plurality of content pieces capable of being provided to the online visitor during the ongoing journey is identified. A correlation score is computed for each content piece using the channel data to generate a plurality of correlation scores. The plurality of content pieces are rank-ordered by sorting the plurality of correlation scores. A display of at least one content piece is effected during the ongoing journey of the online visitor on the enterprise interaction channel based on the rank-ordering of the plurality of content pieces.

30 Claims, 8 Drawing Sheets

METHOD AND APPARATUS FOR DYNAMICALLY SELECTING CONTENT FOR ONLINE VISITORS

CROSS REFERENCE TO RELATED APPLICATIONS

This application claims priority to U.S. provisional patent application Ser. No. 62/255,252, filed Nov. 13, 2015, which is incorporated herein in its entirety by this reference thereto.

TECHNICAL FIELD

The present technology generally relates to content display mechanisms for displaying content to customers on enterprise interaction channels and more particularly to a method and apparatus for dynamically selecting content for online visitors and displaying the selected content to the online visitors during their respective online journeys.

BACKGROUND

Many enterprises aim to offer content that may be of interest to their customers to improve chances of a sale or to provide an enriched customer experience. The content is typically offered to existing and potential customers of the enterprise on enterprise interaction channels, such as Websites, native mobile applications, social media, and the like. The existing or potential customers of the enterprise visiting such enterprise interaction channels are hereinafter referred to as online visitors.

Typically, the online visitor population is categorized into segments based on age, gender, professional activity, location, etc., to facilitate selection of content to be provided to the online visitors during their visit to the enterprise interaction channels. Selection of content based on such a categorization of the online visitors has several shortcomings. For example, the selected content may not be customized to an individual online visitor's current behavior or preference. In many scenarios, the content provisioned to an online visitor is not what the online visitor may be interested in for his current visit to the enterprise interaction channel, and the online visitor may ignore such content. In some cases, the online visitor may also get frustrated from viewing irrelevant content and may exit the interaction, leading to a loss for the enterprise.

There is a need to provision content that is customized to an individual online visitor's current behavior or preference. Moreover, there is a need to extend such a provisioning of relevant content to scenarios, where sufficient historical visitor interaction data is absent.

SUMMARY

In an embodiment of the invention, a computer-implemented method for dynamically selecting content for online visitors is disclosed. The method receives, by a processor, information related to activity of an online visitor on an enterprise interaction channel for an ongoing journey of the online visitor on the enterprise interaction channel. The method identifies, by the processor, channel data related to the activity of the online visitor using the received information. The channel data includes one or more data segments. For a plurality of content pieces capable of being provided to the online visitor during the ongoing journey on the enterprise interaction channel, the method computes, by the processor, a correlation score for each content piece from among the plurality of content pieces using the channel data. The computation of the correlation score for each content piece generates a plurality of correlation scores. The method rank-orders, by the processor, the plurality of content pieces by sorting the plurality of correlation scores. The method effects, by the processor, a display of at least one content piece from among the plurality of content pieces during the ongoing journey of the online visitor on the enterprise interaction channel. The display of the at least one content piece is effected based on the rank-ordering of the plurality of content pieces.

In another embodiment of the invention, an apparatus for dynamically selecting content for online visitors includes at least one processor and a memory. The memory stores machine executable instructions therein that, when executed by the at least one processor, cause the apparatus to receive information related to activity of an online visitor on an enterprise interaction channel for an ongoing journey of the online visitor on the enterprise interaction channel. The apparatus identifies channel data related to the activity of the online visitor using the received information. The channel data includes one or more data segments. For a plurality of content pieces capable of being provided to the online visitor during the ongoing journey on the enterprise interaction channel, the apparatus is caused to compute a correlation score for each content piece from among the plurality of content pieces using the channel data. The computation of the correlation score for each content piece generates a plurality of correlation scores. The apparatus is caused to rank-order the plurality of content pieces by sorting the plurality of correlation scores. The apparatus is further caused to effect display of at least one content piece from among the plurality of content pieces during the ongoing journey of the online visitor on the enterprise interaction channel. The display of the at least one content piece is effected based on the rank-ordering of the plurality of content pieces.

In another embodiment of the invention, an apparatus for dynamically selecting content for online visitors includes at least one communication interface configured to receive information related to activity of an online visitor on an enterprise Website for an ongoing journey of the online visitor on the enterprise Website. The apparatus further includes at least one processor and a memory. The memory stores machine executable instructions therein that, when executed by the at least one processor, cause the apparatus to identify Website data related to the activity of the online visitor using the received information. The Website data includes data corresponding to one or more Web pages visited by the online visitor during the ongoing journey. For a plurality of widgets capable of being provided to the online visitor during the ongoing journey on the enterprise Website, the apparatus is caused to compute a correlation score for each widget from among the plurality of widgets using the Website data. The computation of the correlation score for each widget generates a plurality of correlation scores. The apparatus is caused to rank-order the plurality of widgets by sorting the plurality of correlation scores. The apparatus is further caused to effect display of at least one widget from among the plurality of widgets during the ongoing journey of the online visitor on the enterprise Website. The display of the at least one widget is effected based on the rank-ordering of the plurality of widgets.

DETAILED DESCRIPTION

The detailed description provided below in connection with the appended drawings is intended as a description of the present examples and is not intended to represent the only forms in which the invention herein disclosed may be constructed or used. However, the same or equivalent functions and sequences may be accomplished by different examples.

Figure 1:
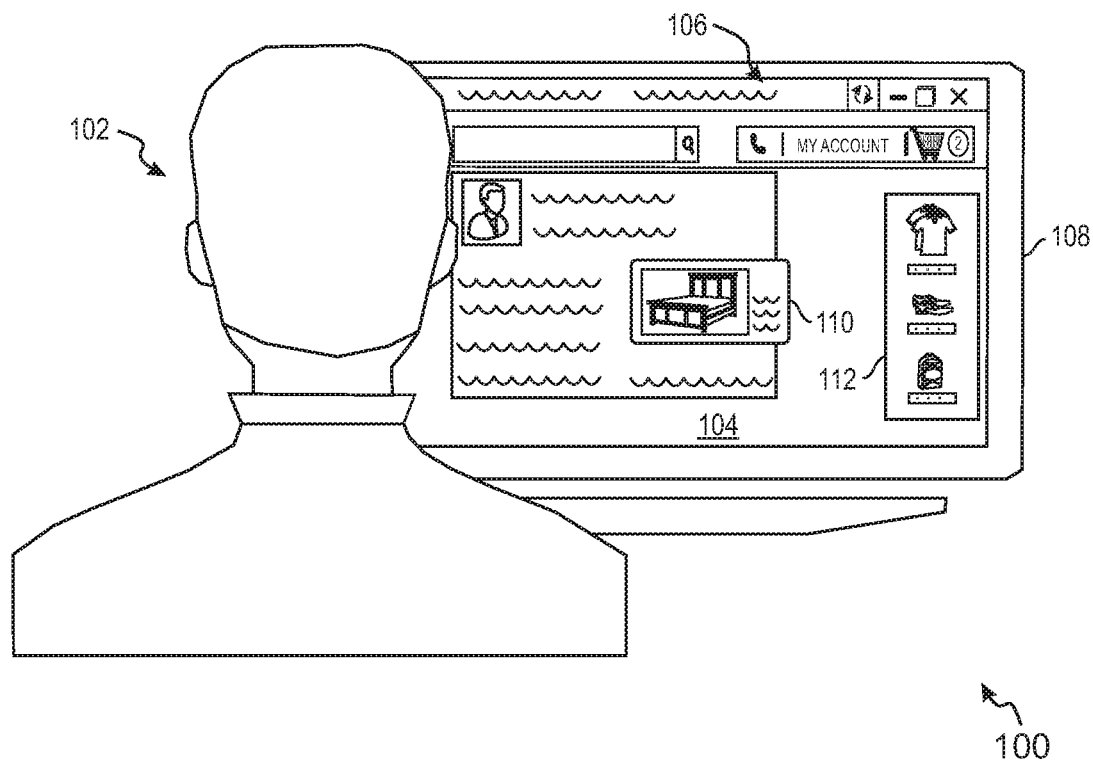
FIG. 1 shows a representation illustrating an example interaction between a customer and an enterprise, in accordance with an example scenario.

FIG. 1 shows a representation 100 for illustrating an example interaction between a customer and an enterprise, in accordance with an example scenario. More specifically, the representation 100 depicts a customer 102 (hereinafter referred to as an online visitor 102) accessing a Website 104 using a Web browser application 106 installed on a desktop computer 108. The Website 104 may be hosted on a remote Web server and the Web browser application 106 may be configured to retrieve one or more Web pages associated with the Website 104 from the remote Web server over a communication network (not shown in FIG. 1). Examples of the communication network may include wired networks, wireless networks, or a combination thereof. Some examples of the wired networks may include Ethernet, local area network (LAN), fiber-optic cable network, and the like. Some examples of the wireless networks may include cellular networks like GSM/3G/4G/CDMA networks, wireless LAN, blue-tooth or ZigBee networks, and the like. An example of the combination of wired and wireless networks may include the Internet. It is understood that the Website 104 may attract a large number of existing and potential customers, such as the online visitor 102.

In the representation 100, the Website 104 is exemplarily depicted to be an e-commerce Website displaying a variety of products and services for sale to online visitors during their journey on the Website 104. It is noted that the term 'journey' as used throughout the description refers to a path an online visitor may take to reach a goal when using a particular interaction channel. For example, the online visitor's journey on the Website 104 may include a number of Web page visits and decision points that carry the online interaction of the online visitor from one step to another step. In an example scenario, the online visitor 102 may be interested in purchasing a laptop and may visit the Website 104 to view laptops offered for sale by various vendors on the Website 104 and evaluate options for purchasing the laptop. Typically, the enterprise may display content, which is generalized for frequent visitors to the Website 104. More specifically, the content may not be customized to individual preferences of the online visitors, such as the online visitor 102. For example, a widget, such as a widget 110, including content related to a promotional offer on purchase of furniture may be displayed to the online visitor 102 during the online visitor's journey on the Website 104.

In another illustrative example one or more advertisements, such as an advertisement 112 related to an on-going sale on apparel, may be displayed to the online visitor 102. The online visitor 102 wishing to purchase a laptop may ignore such content being offered on the Website 104. In many cases, the online visitor 102 on account of having to sift through large amount of uninteresting information to identify content of interest, may get frustrated and may exit the interaction, leading to a loss for the enterprise.

Some enterprises may use historical interaction data associated with the online visitors, such as previous session data of the online visitors on the Website 104, to predict intentions of the online visitors. For example, the historical interaction data of the online visitor 102 may indicate the online visitor 102 being interested in a particular brand of laptops. Accordingly, relevant content and/or information (for example, offers on laptops of a desired brand) may be displayed to the online visitor 102 on the Website 104 to increase chances of a sale or to provide an improved browsing experience to the online visitor 102. However, in many cases, sufficient historical interaction data may not be available for accurately predicting intentions of some online visitors. For example, an online visitor may be visiting an enterprise interaction channel for the first time. In such a case, the historical interaction data may not be available for facilitating prediction of the online visitor's intention and as such, a provisioning of appropriate content to such an online visitor may be a challenge. Moreover, a first-time visitor may not enjoy viewing content that is not found to be of interest and may exit the interaction, perhaps never to return. Such negative online visitor experiences are detrimental to enterprise objectives.

Various embodiments of the invention provide a method and apparatus that are capable of overcoming these and other obstacles and providing additional benefits. More specifically, various embodiments of the invention disclosed herein present unsupervised learning based approaches that can be used to dynamically determine relevant content based on an individual visitor's journey across an enterprise interaction channel. Further, the dynamic selection of relevant content may be extended to scenarios, where sufficient historical visitor interaction data is absent. An apparatus for dynamically selecting content for online visitors is explained with reference to FIG. 2.

Figure 2:
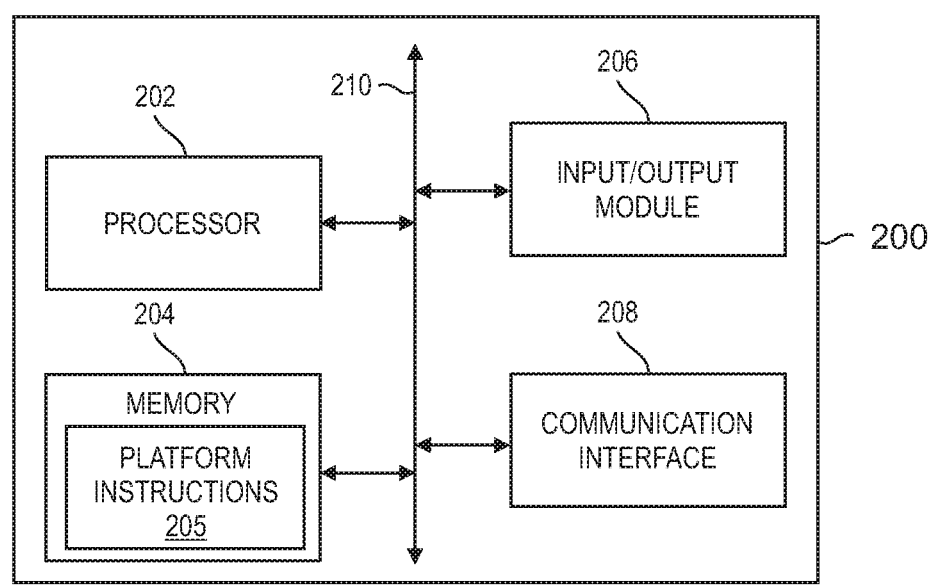
FIG. 2 is a block diagram of an apparatus configured to dynamically select content for online visitors, in accordance with an embodiment of the invention.

FIG. 2 is a block diagram of an apparatus 200 configured to dynamically select content for online visitors in accordance with an embodiment of the invention. It is noted that the term 'online visitor' as used herein refers to a customer (for example, an existing customer or a potential customer of an enterprise) visiting an enterprise interaction channel, such as for example, an enterprise Website, an enterprise native mobile application, or an enterprise social media portal. Moreover, the term 'enterprise' as used herein may refer to a corporation, an institution, a small/medium sized company, or even a brick and mortar entity. For example, the enterprise may be a banking enterprise, an educational institution, a financial trading enterprise, an aviation company, a consumer goods enterprise, or any such public or private sector enterprise.

Furthermore, the term 'dynamically selecting content' as used herein refers to selecting at least one content piece from among a plurality of content pieces such as widgets, advertisements, news stories, pop-ups offering agent assistance, and the like, in substantially real-time based, at least in part, on the current journey of the online visitor on an enterprise interaction channel. The selected content pieces may be then be provisioned, i.e. displayed to the online visitor during the ongoing journey of the online visitor on the enterprise interaction channel, as will be explained hereinafter.

The apparatus 200 includes at least one processor, such as a processor 202 and a memory 204. It is noted that although the apparatus 200 is depicted to include only one processor, the apparatus 200 may include any number of processors therein. In an embodiment, the memory 204 is capable of storing machine executable instructions, referred to herein as platform instructions 205. Further, the processor 202 is capable of executing the platform instructions 205. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.).

The apparatus 200 also includes an input/output module 206 (hereinafter referred to as 'I/O module 206') and at least one communication interface such as the communication interface 208. In an embodiment, the I/O module 206 may include mechanisms configured to receive inputs from and provide outputs to the user of the apparatus 200. To that effect, the I/O module 206 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like.

In an example embodiment, the processor 202 may include I/O circuitry configured to control at least some functions of one or more elements of the I/O module 206, such as, for example, a speaker, a microphone, a display, and/or the like. The processor 202 and/or the I/O circuitry may be configured to control one or more functions of the one or more elements of the I/O module 206 through computer program instructions, for example, software and/or firmware, stored on a memory, for example, the memory 204, and/or the like, accessible to the processor 202.

The communication interface 208 may include several channel interfaces to communicate with a plurality of enterprise interaction channels. Some non-limiting examples of the enterprise interaction channels may include a Web channel (i.e. an enterprise Website), a voice channel (i.e. voice-based customer support), a chat channel (i.e. a chat support), a native mobile application channel, a social media channel and the like. Each channel interface may be associated with a respective communication circuitry such as for example, a transceiver circuitry including antenna and other communication media interfaces to connect to a wired and/or wireless communication network. The communication circuitry associated with each channel interface may, in at least some example embodiments, enable transmission of data signals and/or reception of signals from remote network entities, such as Web servers hosting enterprise Website or a server at a customer support or service center configured to maintain real-time information related to interactions between customers and agents.

In at least one example embodiment, the channel interfaces are configured to receive up-to-date information related to the customer-enterprise interactions from the enterprise interaction channels. In some embodiments, the information may also be collated from the plurality of devices used by the customers. To that effect, the communication interface 208 may be in operative communication with various customer touch points, such as electronic devices associated with the customers, Websites visited by the customers, devices used by customer support representatives (for example, voice agents, chat agents, IVR systems, in-store agents, and the like) engaged by the customers, and the like.

The communication interface 208 may further be configured to receive information related to current journeys of online visitors on enterprise interaction channels, such as enterprise Websites, enterprise native mobile applications, enterprise social media forums, etc., in real-time and provide the information to the processor 202. In at least some embodiments, the communication interface 208 may include relevant application programming interfaces (APIs) to communicate with remote data gathering servers associated with such enterprise interaction channels. Moreover, the communication between the communication interface 208 and the remote data gathering servers may be realized over various types of wired or wireless networks.

In an embodiment, various components of the apparatus 200, such as the processor 202, the memory 204, the I/O module 206 and the communication interface 208 are configured to communicate with each other via or through a centralized circuit system 210. The centralized circuit system 210 may be various devices configured to, among other things, provide or enable communication between the components (202-208) of the apparatus 200. In certain embodiments, the centralized circuit system 210 may be a central printed circuit board (PCB) such as a motherboard, a main board, a system board, or a logic board. The centralized circuit system 210 may also, or alternatively, include other printed circuit assemblies (PCAs) or communication channel media.

It is noted that the apparatus 200 as illustrated and hereinafter described is merely illustrative of an apparatus that could benefit from embodiments of the invention and, therefore, should not be taken to limit the scope of the invention. It is noted that the apparatus 200 may include fewer or more components than those depicted in FIG. 2. In an embodiment, the apparatus 200 may be implemented as a platform including a mix of existing open systems, proprietary systems, and third party systems. In another embodiment, the apparatus 200 may be implemented completely as a platform including a set of software layers on top of existing hardware systems. In an embodiment, one or more components of the apparatus 200 may be deployed in a Web Server. In another embodiment, the apparatus 200 may be a standalone component in a remote machine connected to a communication network and capable of executing a set of instructions (sequential and/or otherwise) to dynamically select content to be provisioned to online visitors based on their respective journeys on the enterprise interaction channels. Moreover, the apparatus 200 may be implemented as a centralized system, or, alternatively, the various components of the apparatus 200 may be deployed in a distributed manner while being operatively coupled to each other. In an embodiment, one or more functionalities of the apparatus 200 may also be embodied as a client within devices, such as customers' devices. In another embodiment, the apparatus 200 may be a central system that is shared by or accessible to each of such devices.

The dynamic selection of content by the apparatus 200 is hereinafter explained with reference to one online visitor. It is noted the apparatus 200 may be caused to dynamically select content for several online visitors in a similar manner.

In at least one example embodiment, the processor 202 is configured to, with the content of the memory 204, cause the apparatus 200 to receive information related to activity of an online visitor on an enterprise interaction channel for an ongoing journey of the online visitor on the enterprise interaction channel. As explained above, the communication interface 208 is configured to receive information related to journeys of various online visitors on one or more enterprise interaction channels in an ongoing manner in real time. Some non-exhaustive examples of an enterprise interaction channel may include a Web channel, a social channel, a native application channel, and the like. In an illustrative example, an online visitor may visit a Website, i.e. the Web channel associated with an enterprise for learning about products and/or services associated with the enterprise. In such a scenario, the communication interface 208 may be configured to receive information related to activity of the online visitor, such as information related to a current Web page that the online visitor is accessing, previous Web pages visited, time spent on a Web page, search terms used, and the like. The communication interface 208 may be configured to send the received information to the processor 202 directly, or to store the information in the memory 204 for subsequent access by the processor 202.

In at least one example embodiment, the processor 202 is configured to, with the content of the memory 204, cause the apparatus 200 to identify channel data related to the activity of the online visitor using the received information. For example, if the received information corresponds to online visitor's Website activity information, then the apparatus 200 may be caused to identify which Web pages the online visitor has visited during the journey. In such a scenario, the channel data identified for such a visitor journey may correspond to data (for example, textual data) corresponding to Web page content of the Web pages visited by the online visitor during the ongoing journey on the enterprise Website.

In another illustrative example, if the received information corresponds to online visitor's activity on a native mobile application channel, then the apparatus 200 may be caused to identify textual data related to various UIs accessed by the online visitor during a journey on the native mobile application as the channel data.

Channel data may include one or more data segments. For example, if the channel data corresponds to overall content of all Web pages visited by the online visitor, then each data segment may correspond to content related to one Web page visited by the online visitor. Similarly, if the channel data corresponds to overall textual content of UIs of the native mobile application accessed by the online visitor, then each data segment may correspond to textual content of one UI from among the several UIs accessed by the online visitor.

In at least one example embodiment, upon receiving information related to online visitor's journey, the processor 202 may be configured retrieve all possible content (also interchangeably referred to herein as 'content pieces') that may be offered to the online visitor from the memory 204. For example, the processor 202 may retrieve several content pieces such as widgets (or pop-ups) including textual content related to advertisements, promotional offers, discount coupons, news snippets, frequently asked questions (FAQs), and the like.

In at least one example embodiment, the processor 202 may be configured to dynamically select appropriate content pieces from among the retrieved content pieces based on information received at any arbitrary point in time in the online visitor's journey and provision the selected content pieces to the online visitor on the enterprise interaction channel.

The dynamic selection of content pieces needs to be customized based on an individual online visitor's current journey. At a high level, the challenge of dynamically selecting relevant content pieces may be stated as:

"At any precise time t, given a finite database of 'm' static content pieces (for example, content pieces related to advertisements, promotional offers, discount coupons, news stories, frequently asked questions (FAQ), and the like), how to determine 'k' relevant content pieces, based on given interaction data for an arbitrary online visitor u, from time t−τ to time t, for time τ>0".

The solution to such a problem is hereinafter explained using an example of content pieces in form of widgets. More specifically, the dynamic selection of content pieces by the apparatus 200 is explained using an example of dynamic selection of widgets from a widget bank comprising a plurality of widgets. It is however noted that the dynamic selection of content pieces may not be limited to widgets but may include any form of content, such as those related to advertisements, news snippets, promotional offers, discount coupons, FAQs, etc., that may be processed to retrieve appropriate content for the online visitors. In at least one example embodiment, the widgets may include textual content related to advertisements, news snippets, promotional offers, discount coupons, FAQs, and the like.

When stated in terms of widgets, the problem statement of dynamic selection of content assumes the form:

Given the following: (1) A widget bank, that constitutes a finite number of m widgets, where each widget includes a small piece of text of arbitrary length, that is relevant to a Website, for example, a promotional/marketing message targeting a specific product, and (2) an arbitrary length of Web journey (for example, n Web pages visited) by the online visitor on the Website, determine which of the top k widgets from the set of m widgets should be shown for any arbitrary point of time t (or for example at the $i^{th}$ page load, where i=1, 2 . . . n).

Figure 3:
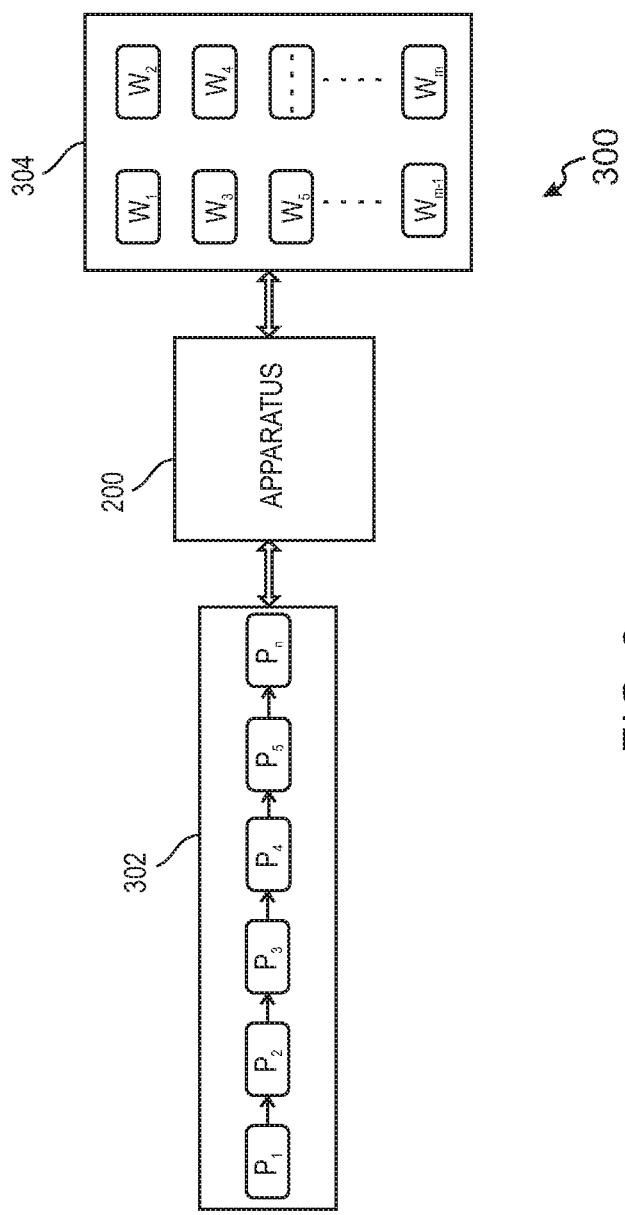
FIG. 3 shows an example representation for illustrating a dynamic widget selection problem, in accordance with an embodiment of the invention.

A pictorial representation of the dynamic widget selection problem is depicted in FIG. 3.

FIG. 3 shows an example representation 300 for illustrating a dynamic widget selection problem, in accordance with an embodiment of the invention. An online visitor at an arbitrary point of time during an ongoing journey on a Website is shown to have visited a total of 'n' Web pages in the Website. The 'n' Web pages visited by the online visitor so far are shown in the block 302 as Web pages '$P_1$', '$P_2$', '$P_3$', '$P_4$', '$P_5$' to '$P_n$' in the example representation 300. In an illustrative scenario, the Website may be an e-commerce Website and the Web pages '$P_1$', '$P_2$', '$P_3$', '$P_4$', '$P_5$' to '$P_n$', may correspond to a 'home page', a 'product page 1', a 'cart page', a 'checkout page', a 'return product page', and a 'feedback page', respectively.

As explained with reference to FIG. 2, the apparatus 200 is configured to receive information (via the communication interface 208) corresponding to an ongoing journey of an online visitor. The apparatus 200 is also associated with a widget bank 304 including a total of 'm' widgets, '$W_1$', '$W_2$', '$W_3$', '$W_4$', '$W_5$' to '$W_m$' corresponding to widgets that may be offered to the online visitor upon the online visitor's access of the Website. Although the widget bank 304 is depicted to be externally stored with respect to the apparatus 200, in at least some embodiments, the memory 204 of the apparatus 200 may maintain a local copy of the 'm' widgets constituting the widget bank 304. In an illustrative example, the widgets '$W_1$', '$W_2$', '$W_3$', '$W_4$', '$W_5$' to '$W_m$' may include static text content related to promotional or marketing message targeting the relevant Web pages in the Website.

The dynamic widget selection problem in such a scenario corresponds to the problem of determining the top 'k' relevant widgets from among 'm' widgets, to be provided to the online visitor given the online visitor's journey encompassing a visit to Web pages from $P_1$ to $P_n$.

Referring now to FIG. 2, in at least one example embodiment, the processor 202 of the apparatus 200 is configured to treat the channel data as a strong indicator of 'what the visitor is looking for'. For example, the apparatus may treat content of the Web pages that an online visitor to a Website has visited, as a strong indicator of 'what the visitor is looking for'. In an illustrative example, given two widgets $W_1$ and $W_2$, with $W_1$ including text: 'Click here for 50% discount on Smartphones', and $W_2$ including text 'Not happy with what you purchased? Return it with a single click', an online visitor having visited Web pages predominantly in the category of 'Mobiles & Smartphones' is more susceptible to click on $W_1$, while another online visitor who is in the 'Customer Service' section and looking at FAQs about return policies, is more likely to click on $W_2$. Accordingly, based on the channel data, one or more widgets including relevant text content may be provisioned to the online visitor.

In at least one example embodiment, the processor 202 is configured to, with the content of the memory 204, cause the apparatus 200 to compute, using channel data, a correlation score for each content piece from among a plurality of content pieces capable of being provided to the online visitor during the ongoing journey on the enterprise interaction channel. As explained above, the plurality of content pieces may include content pieces, such as widgets or pop-ups, displaying content related to at least one of advertisements, promotional offers, discount coupons, offers for agent assistance, news stories, frequently asked questions (FAQs), and the like. The computation of the correlation score for each content piece from among the plurality of content pieces generates a plurality of correlation scores. The computation of correlation scores using channel data is explained hereinafter.

In at least one example embodiment, the apparatus 200 is caused to compute, for each content piece, a cosine similarity score corresponding to each data segment from among the one or more data segments to generate one or more cosine similarity scores for each content piece. As explained above, channel data, such as for example, data related to Web pages visited by the online visitor may be identified based on the received information related to the activity of the online visitor. Accordingly, a cosine similarity score may be computed for each combination of a data segment (for example, a Web page) and a content piece (for example, a widget). Each computed cosine similarity score is indicative of a measure of correlation between content corresponding to a respective content piece and content corresponding to a data segment.

In an embodiment, computing a cosine similarity score for a combination of a data segment and a content piece includes identifying a list of elements common to the content of the respective content piece and the content of the data segment. In an illustrative example, elements may correspond to words included in the textual content of the data segment and the content piece. Accordingly, a list of words, which are common to a data segment and the content piece, may be identified.

The apparatus 200 may further be caused to compute a first vector and a second vector based on a number of occurrences of each element from among the list of elements in the content of the data segment and the content piece, respectively. A cosine component of an angle between the first vector and the second vector may then be determined to compute the cosine similarity score corresponding to a combination of one data segment and one content piece. The cosine similarity scores may be similarly computed for combinations of various data segments with each content piece. Further, the apparatus 200 is caused to compute, for each content piece, an average value of the respective cosine similarity scores, i.e. average of cosine similarity scores corresponding to combinations of a content piece and each data segment configuring the channel data. In at least one example embodiment, the average value of the respective cosine similarity scores for each content piece may be considered as the correlation score for each content piece. The computation of the correlation score based on cosine similarity scores is explained next with reference to an illustrative example.

In an illustrative example, an online visitor may currently be accessing one or more Web pages of an enterprise Website. The apparatus 200 may receive the information related to activity of the online visitor corresponding to the ongoing journey of the online visitor. The apparatus 200 may further be caused to determine a correlation between the content of Web pages and content of 'm' widgets. To that effect, in one embodiment, the processor 202 is configured to, with the content of the memory 204, cause the apparatus 200 to compute a page-wise cosine similarity score based on content of each Web page visited so far and text content of each widget stored in the widget bank.

An example computation of a page-wise cosine similarity score based on content of a Web page $P_a$ and text content of a widget $W_b$ is explained hereinafter. In an embodiment, a list 'A' of 'j' common dictionary words present in content of the Web page '$P_a$' and the text content of the widget '$W_b$' is generated. In an illustrative example, the list A including 'j' words common to both the Web page '$P_a$' and the widget '$W_b$' may be represented as depicted below:

$$A = <w_1, w_2, \ldots w_j>$$

Thereafter, a first vector referred to herein as 'a page term vector ($\vec{P_a}$)' may be computed, where an '$i^{th}$' element of the page term vector ($\vec{P_a}$) is a number of occurrences of word '$w_i$' in the Webpage '$P_a$' for 'i'=1, 2 . . . j. Similarly, a second vector referred to herein as a 'widget term vector ($\vec{W_b}$)' may be computed, where an '$i^{th}$' element of the widget term vector ($\vec{W_b}$) is a number of occurrences of word '$w_i$' in the widget '$W_b$' for 'i'=1, 2 . . . j.

The page-wise cosine similarity score may then be computed by the processor 202 of the apparatus 200 using the equation (1) depicted below:

$$\sigma(\vec{W_b}, \vec{P_a}) = (\vec{W_b} \cdot \vec{P_a}) / (\|\vec{W_b}\| \cdot \|\vec{P_a}\|) \quad (1)$$

As can be seen from equation (1), the page-wise cosine similarity score obtained by computing $\sigma(\vec{W_b}, \vec{P_a})$ between the page term vector ($\vec{P_a}$) and the widget term vector ($\vec{W_b}$), is simply the cosine of the angle between the page term vector ($\vec{P_a}$) and the widget term vector ($\vec{W_b}$). The computation of the first term vector, i.e. the page term vector ($\vec{P_a}$) and the second term vector, i.e. the widget term vector ($\vec{W_b}$) based on the number of occurrences of common words in respective content of a data segment, i.e. a Web page, and a content piece, i.e. a widget is explained with reference to an illustrative example in FIG. 4.

Figure 4:
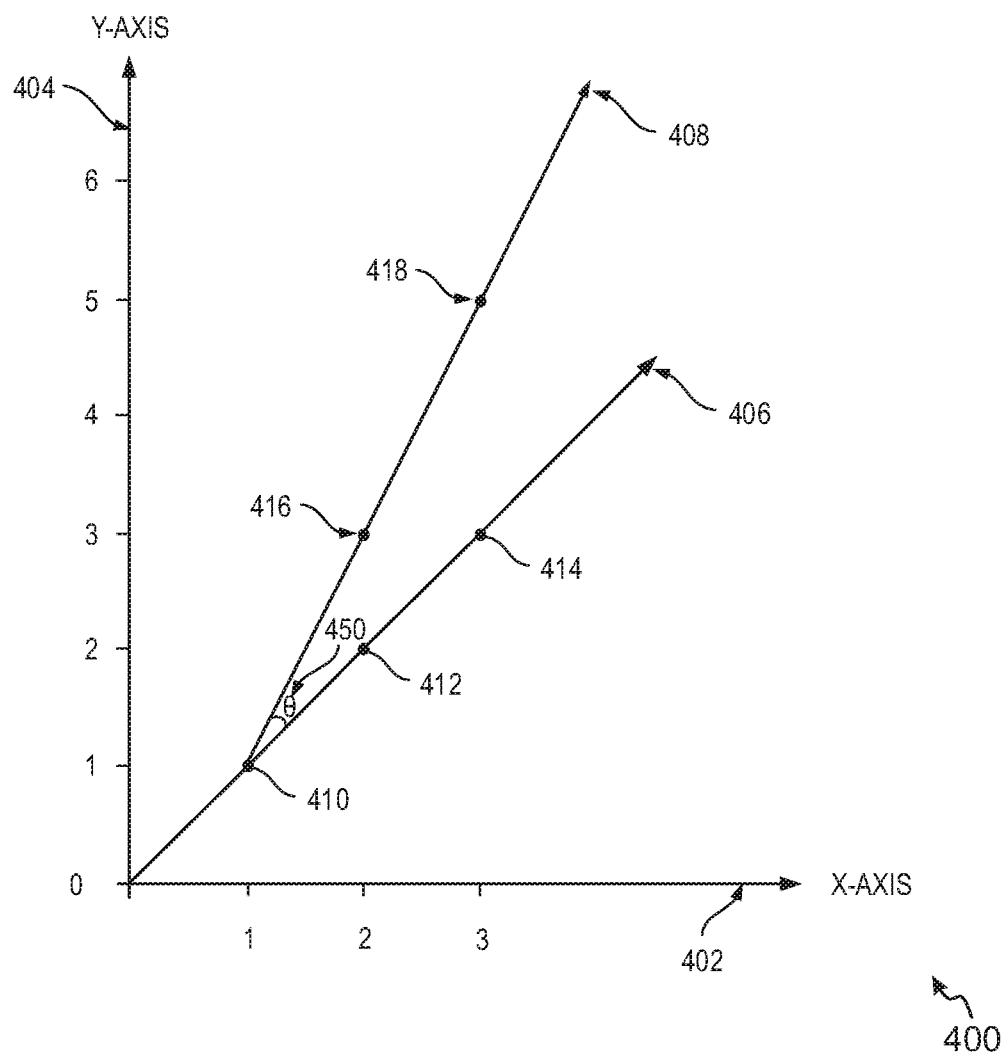
FIG. 4 shows a graphical representation for illustrating a computation of a page-wise cosine similarity score, in accordance with an embodiment of the invention.

FIG. 4 shows a graphical representation 400 (hereinafter referred to as plot 400) for illustrating a computation of a page-wise cosine similarity score, in accordance with an embodiment of the invention. As explained above, the page-wise cosine similarity score is indicative of a measure of correlation between content of a data segment, such as a Web page '$P_a$', and a content piece, such as a widget '$W_b$'. Further, as explained above, to compute the page-wise cosine similarity score, a list of words common to the respective contents of the Web page '$P_a$' and the widget '$W_b$' may be identified.

In a simplified example scenario, a list of words present in the textual content associated with the Web page '$P_a$' may be Laptop, Mobile, Printer, Keyboard, and Headphones. Similarly, a list of words present in the textual content associated with the widget '$W_b$' may be Discount, Laptop, Checkout, Mobile, Charger, and Printer.

Accordingly, a list 'A' of all the common dictionary words present in content of the Web page '$P_a$' and the text content of the widget '$W_b$' may correspond to:

$$A = <Laptop, Mobile, Printer>$$

Further, a number of occurrences of each word in list A in textual content corresponding to the Web page '$P_a$' and the Widget '$W_b$' may be determined. For example, the words 'Laptop', 'Mobile', and 'Printer' may occur one time, two times, and three times, respectively in the Web page '$P_a$'. Further, the words 'Laptop', 'Mobile', and 'Printer' may occur two times, three times, and four times, respectively in the Widget '$W_b$'. The number of occurrences of each common word may be plotted to compute the first vector and the second vector as depicted in the plot 400. More specifically, the plot 400 includes an X-axis 402 representing list of common words (i.e. List A) present in the Web page '$P_a$' and the widget '$W_b$'. More specifically, (1,0) corresponds to the first common word, i.e. a Laptop; (2,0) corresponds to the second common word i.e. Mobile; and (3,0) corresponds to the third common word 'Printer' and a Y-axis 404 representing numerical values corresponding to the number of occurrences of each common word in the List A.

The number of occurrences for words 'Laptop', 'Mobile' and 'Printer' may be plotted at 410, 412, 414, i.e. at co-ordinates (1, 1), (2, 2), and (3, 3), respectively, to reflect one time, two times, and three times occurrence of these words in the content of the Web page. A first vector or the page-term vector ($\vec{P_a}$) may be computed by joining these co-ordinates with a single directed line 406.

The number of occurrences for words 'Laptop', 'Mobile', and 'Printer' may be plotted at 410, 416, 418, i.e. co-ordinates (1, 1), (2, 3), and (3, 5), respectively, to reflect one time, three times, and five times occurrence of these words in the content of the Web page. A second vector or a widget-term Vector ($\vec{W_b}$) may be computed by joining these co-ordinates with a single directed line 408.

A page-wise cosine similarity score may then be computed by measuring the cosine of the angle 'θ' 450 between the page-term vector ($\vec{P_a}$) and widget-term vector ($\vec{W_b}$) or alternately by using the equation depicted below:

$$\sigma(\vec{W_b}, \vec{P_a}) = (\vec{W_b} \cdot \vec{P_a}) / (\|\vec{W_b}\| \cdot \|\vec{P_a}\|)$$

In at least one example embodiment, page-wise cosine similarity scores may be computed by the processor 202 for all the Web pages in the Website, with all the widgets in the widget bank. More specifically, a correlation score (i.e., page-wise cosine similarity score) between words in a Web page and words in a widget may be computed for all the Web pages and widgets. In an illustrative example, if the Website has a total of 'n' pages, and the widget bank has 'm' widgets, then an 'm×n' matrix of page-wise cosine similarity scores may be generated. Such a 'm×n' matrix of page-wise cosine similarity scores is exemplarily depicted in FIG. 5.

Figure 5:
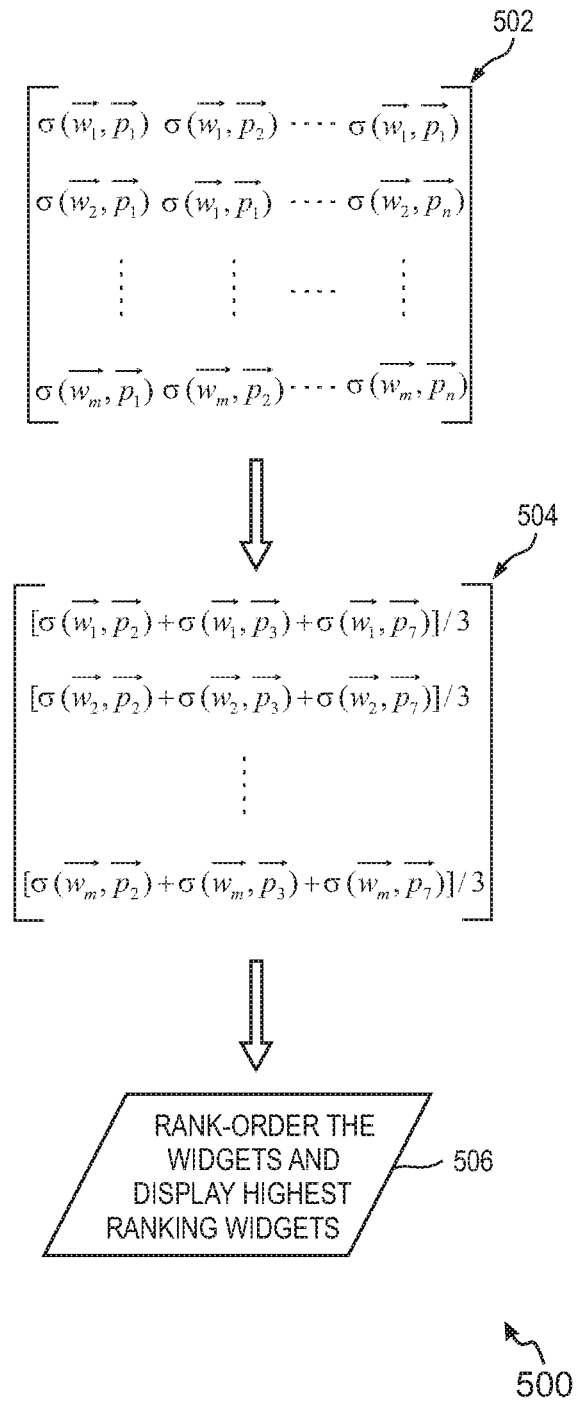
FIG. 5 shows an example representation for illustrating a process flow for selection of top k widgets, in accordance with an embodiment of the invention.

Referring now to FIG. 5, an example representation 500 for illustrating a process flow for selection of top k widgets is shown, in accordance with an embodiment of the invention. More specifically, the representation depicts matrix 502 including a plurality of entries, where each entry represents a cosine similarity score computed for a Web page from among 'n' Web pages of a Web site and a widget from among 'm' widgets in a widget bank, in accordance with an embodiment of the invention. For example, the entry $\sigma(\vec{W_1}, \vec{P_1})$ represents a cosine similarity score computed based on content of widget 1 and content of Web page 1. The cosine similarity scores $\sigma(\vec{W_1}, \vec{P_2})$, $\sigma(\vec{W_1}, \vec{P_3})$ to $\sigma(\vec{W_1}, \vec{P_n})$ are computed based on content of widget 1 and content of Web pages 2, 3 to n, respectively. Similarly, the cosine similarity scores $\sigma(\vec{W_2}, \vec{P_1})$, $\sigma(\vec{W_2}, \vec{P_2})$ to $\sigma(\vec{W_2}, \vec{P_2})$ are computed based on content of widget 2 and content of the Web pages 1, 2 to n, respectively, and so on, and so forth.

In at least one example embodiment, the processor 202 is further configured to compute average cosine similarity scores for the Web pages visited by the online visitor. For example, based on the visitor's journey encompassing visit to Web pages $P_2$, $P_3$ and $P_7$, a matrix 504 may be configured with each entry in the matrix 504 representing average cosine similarity score corresponding to a widget from among the 'm' widgets. The average cosine similarity score for each widget may be computed by averaging the individual cosine similarity scores between the widget and the three Web pages (i.e. the Web pages $P_2$, $P_3$, and $P_7$) visited by the online visitor during the visitor's journey on the Website. For example, cosine similarity scores between a widget $W_1$ and each of the pages $P_2$, $P_3$, and $P_7$ may be averaged to determine an average cosine similarity score for widget $W_1$ as depicted by entry '$\sigma(\vec{W_1},\vec{P_2})+\sigma(\vec{W_1},\vec{P_3})+\sigma(\vec{W_1},\vec{P_7}))/3$'. Similarly, an average cosine similarity score for widget 2 may be computed as depicted in entry '$\sigma(\vec{W_2},\vec{P_2})+\sigma(\vec{W_2},\vec{P_3})+\sigma(\vec{W_2},\vec{P_7}))/3$' and so on, and so forth.

Referring now to FIG. 2, in at least one example embodiment, the processor 202 is configured to, with the content of the memory 204, cause the apparatus 200 to rank-order the plurality of content pieces by sorting the plurality of correlation scores. Further, the apparatus 200 may be caused to display at least one content piece from among the plurality of content pieces to the online visitor during the ongoing journey on the enterprise interaction channel based on the rank-ordering of the plurality of content pieces. More specifically, the processor 202 may cause the communication interface 208 of the apparatus 200 to send data signals related to the selection of at least one content piece to a Web server hosting the enterprise Website, which may then display the one or more content piece during the ongoing journey of the online visitor on the enterprise interaction channel. For example, in FIG. 5, the processor 202 may perform a rank-ordering of widgets and select/display highest ranking widgets to the online visitor as exemplarily depicted in block 506. For example, the processor 202 may be configured to select top 'k' widgets based on the rank associated with each widget. In an illustrative example, the value of 'k' may be chosen to be one. Accordingly, the top ranking widget may be displayed to the visitor on the Website. For example, for an online visitor visiting a Website to purchase a laptop, a widget including static content related to an equated monthly installment (EMI) scheme for purchasing laptops may be displayed to the online visitor on the Website. Similarly, a widget including advertisement content related to a promotional offer or content related to a Web-link showcasing laptop brand comparisons, laptop model reviews and the like, may also be displayed to the online visitor. It is noted the widget including such textual content may be displayed to the online visitor as shown using widget 110 (or advertisement 112) in FIG. 1. In some embodiments, for an online visitor wishing to resolve a query, a chat widget offering a chat interaction with a human agent or a virtual agent, or alternatively, frequently asked questions (FAQ) page content may be displayed to the online visitor. It is understood that the value of 'k' for selecting k top widgets is described herein to be 'one' for illustration purposes and it is understood that the value of k may be chosen to be any number greater than one, and the display provided to the online visitor may be appended/modified, accordingly.

In an embodiment, the apparatus 200 is caused to compute for each content piece, a cumulative cosine similarity score indicative of a measure of correlation between content corresponding to a respective content piece and cumulative content corresponding to the one or more data segments. In an embodiment, computing the cumulative cosine similarity score for a content piece includes identifying a list of elements common to content of the content piece and the cumulative content corresponding to the one or more data segments. The apparatus 200 is further caused to compute a cumulative term vector based on a number of occurrences of each element from among the list of elements in the cumulative content, and, a second vector based on a number of occurrences of each element in the content of the content piece. The apparatus 200 is then caused to compute the cumulative cosine similarity score, at least in part, by determining a cosine component of an angle between the cumulative term vector and the second vector. The respective cumulative cosine similarity score computed for each content piece may configure the correlation score for the each content piece. The computation of the cumulative cosine similarity score for each content piece is explained with an illustrative example below.

In the illustrative example explained with reference to FIGS. 3, 4, and 5, the processor 202 of the apparatus 200 determines a correlation between the content of each Web page and the content of the 'm' widgets. In a similar manner, in some embodiments, the apparatus 200 may be caused to compute correlation in form of cosine similarity scores based on cumulative text content of Web pages visited so far by the online visitor during an on-going journey on the Website, and the text content of individual widgets. For example, for a visitor's journey involving visits to Web pages 2, 3 and 7, a computation of cumulative-page cosine similarity scores may first involve creating a cumulative dictionary from all unique words on Web pages $P_2$, $P_3$ and $P_7$. Thereafter, a list A including 'j' common words between the words in the cumulative dictionary and words in a widget $W_b$ may be generated.

In an illustrative example, the list A may be represented as depicted below:

$$A=<w_1,w_2,\ldots w_j>$$

Thereafter, a cumulative term vector ($\vec{C_{2,3,7}}$) may be computed, where an '$i^{th}$' element of the cumulative term vector ($\vec{C_{2,3,7}}$) is a number of occurrences of word '$w_i$' in the cumulative dictionary $\Sigma_{2,3,7}$ for 'i'=1, 2 . . . j. Similarly, a second vector (also referred to herein as the widget term vector ($\vec{W_b}$) may be computed, where an '$i^{th}$' element of the widget term vector ($\vec{W_b}$) is a number of occurrences of word '$w_i$' in the widget '$W_b$' for 'i'=1, 2 . . . j.

The cumulative cosine similarity score may then be computed by the processor 202 of the apparatus 200 using the equation (2) depicted below:

$$\sigma(\vec{W_b},\vec{C_{2,3,7}})=(\vec{W_b}\cdot\vec{C_{2,3,7}})/(\|\vec{W_b}\|\cdot\|\vec{C_{2,3,7}}\|) \qquad (2)$$

Having computed the cumulative cosine similarity scores for the cumulative dictionary, with respect to each of the 'm' widgets in the widget bank, the widgets are then rank-ordered on the basis on sorting their cumulative cosine similarity scores (for example sorting in descending order). Based on this rank-ordering, the top k widgets may be provisioned to the online visitor as explained with reference to FIG. 6.

Figure 6:
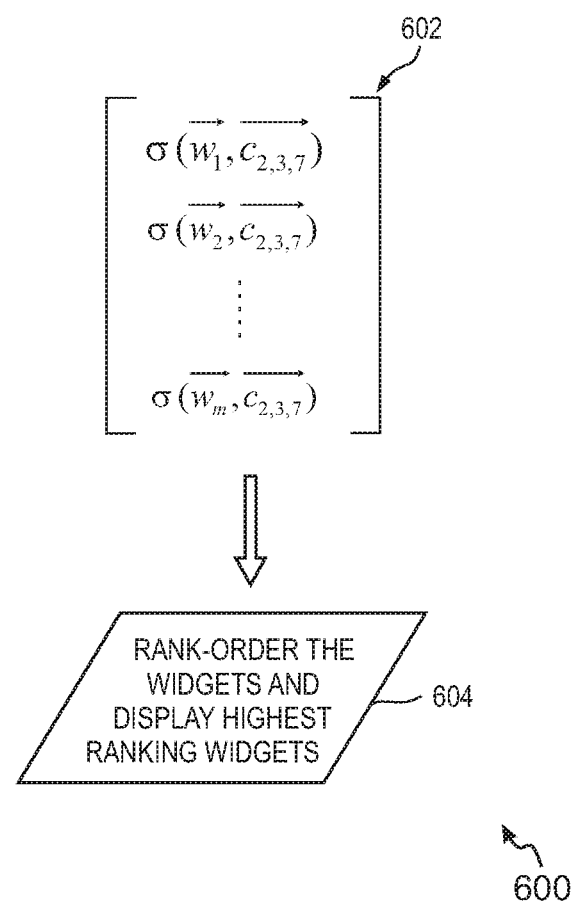
FIG. 6 shows an example representation for illustrating a process flow for selection of top k widgets, in accordance with another embodiment of the invention.

Referring now to FIG. 6, an example representation 600 of a process flow for illustrating a selection of top k widgets is shown, in accordance with another embodiment of the invention. More specifically, the example representation 600 depicts a matrix 602 with each entry in the matrix 602 representing an individual widget's cumulative cosine similarity score for the online visitor's journey to Web pages, $P_2$, $P_3$ and $P_7$. For example, $\sigma(\vec{W}_1, \vec{C}_{2,3,7})$, $\sigma(\vec{W}_2, \vec{C}_{2,3,7})$, $\sigma(\vec{W}_3, \vec{C}_{2,3,7})$ to $\sigma(\vec{W}_m, \vec{C}_{2,3,7})$ represent cumulative-page cosine similarity scores for widgets 1, 2, 3 to m, respectively. The widgets may then be rank-ordered, for example ordered from highest ranking widget to lowest ranking widget based on their respective cumulative cosine similarity scores.

The processor 202 may then be configured to select top 'k' widgets based on the rank associated with each widget as exemplarily depicted in block 604. As explained with reference to FIG. 5, the value of 'k' may be exemplarily chosen to be one or any such number to facilitate display of the top ranking widgets to the online visitor on the Website.

As explained above, the correlation between content pieces and the data segments of the enterprise interaction channels may be computed using either segment-wise or page-wise cosine similarity scores or cumulative cosine similarity scores. In some embodiments, the apparatus 200 may be caused to compute the correlation score for each content piece using reservoir computing frameworks, such as a recurrent neural network (RNN) framework. In an embodiment, the recurrent neural network framework corresponds to an Echo state network (ESN). It is noted that ESN in principle, is a supervised learning based computational framework for a recurrent neural network (RNN). Moreover, it is noted that a sparsely connected RNN is one type of reservoir. Further, it is also understood that the reservoir includes a plurality of neurons and synapses, where each neuron may be a node configured to receive input units from external sources, as well as from other neurons in the reservoir, and the synapses are configured to pass information between the neurons and/or between the inputs and the neurons. In an example embodiment, the neurons in the reservoir may be connected to each other in a random manner or using a predetermined probability distribution function. The reservoir's dynamic state at time x(t), in response to the external input u(t), is the high-dimensional non-linear projection of the low-dimensional input space. The time-constants of the neurons and the synapses in the reservoir endows the reservoir with fading memory, i.e. the dynamic state of the reservoir at time t, x(t), not only contains information about the current input u(t), but also information about previous inputs in duration [t−τ, t], where τ is the fading memory capacity of the reservoir. Finally, the desired output signal is obtained by using a trainable linear combination of the recurrent network's dynamical state (i.e., simple linear readouts can be trained to predict target values y(t) from x(t)).

In one example embodiment, the computation of correlation scores for each content piece, such as a widget, may be computed by providing a sequence of elements (for example, words) configuring the content piece to a ESN reservoir and reading outing the final state of the ESN reservoir. The content of data segments (for example, Web page content) may be fed to a similar ESN reservoir and the final state of the ESN reservoir recorded. The final states of the two ESN reservoirs may be compared and based on a measure of similarity (or dissimilarity), a correlation score for the content piece may be determined. In at least one embodiment, the content of data segments and/or content pieces may be fed element-by-element. Further, each element may be provided as an input character-by-character. In some embodiments, the input sequence of elements provided to the ESN reservoir may be limited by predefined number of characters. In an illustrative example, a set comprising a plurality of elements including elements corresponding to the one or more data segments and elements corresponding to the plurality of content pieces may be generated by the apparatus 200. A standard deviation value and a mean value may be computed from respective lengths of the plurality of elements. The apparatus 200 is further caused to determine a length of each element in the inputs provided to the ESN reservoirs based on the standard deviation value and the mean value. The operations involved in computation of correlation scores using ESN reservoirs are further explained below.

In an embodiment, the apparatus 200 is caused to generate a primary ESN reservoir. As explained above, an ESN reservoir includes a plurality of neurons, where one or more neurons are interconnected randomly or connected to each other based on a predefined probability distribution function. The apparatus 200 is caused to provide a first input comprising a sequence of elements (for example, textual words) configuring the content of one or more data segments. The apparatus 200 is further configured to record a state of the primary ESN reservoir subsequent to provisioning of the first input to the primary ESN reservoir.

The apparatus 200 is further caused to generate a plurality of secondary ESN reservoirs. Each secondary ESN reservoir is configured to be a clone of the primary ESN reservoir. More specifically, the neuron network within each secondary ESN reservoir is configured to be similar to the neuron network within the primary ESN reservoir.

The apparatus 200 is caused to provide to each secondary ESN reservoir, a respective second input comprising a sequence of elements configuring the content of one content piece from among the plurality of content pieces.

A final state of each secondary ESN reservoir is recorded subsequent to provisioning of the respective second input. The final state of each secondary ESN reservoir is compared to the state of the primary ESN reservoir to compute the correlation score for each content piece. More specifically, the correlation score for each content piece is computed based on the comparison of the final state of the respective secondary ESN reservoir with the state of the primary ESN reservoir.

The computation of correlation score using ESN reservoirs is explained with reference to the earlier example of online visitor's ongoing journey on an enterprise Website below.

To determine correlation between the content of Web pages and content of the 'm' widgets using ESN, the processor 202 may be configured to concatenate word content of the 'n' Web pages in the visitor's ongoing journey in the exact sequence as they appeared in the Web pages to form a concatenated input sequence $\overline{\omega}_{journey}$ as depicted below:

$$\overline{\omega}_{journey} = (w_1^1, w_2^1, \ldots w_{p1}^1 | w_1^2, w_2^2, \ldots w_{p2}^2 | w_1^n, w_2^n, \ldots w_{pn}^n)$$

The word sequence of the 'm' widgets may be described by input sequences $\overline{\omega}_{widget}^i$ for i=1, 2, 3, . . . m, where $\overline{\omega}_{widget}^i$ may be represented as follows:

$$\overline{\omega}_{widget}^i = (\omega_1^i, \omega_2^i, \ldots \omega_{\beta 1}^i)$$

Where $\omega_1^i, \omega_2^i, \ldots \omega_{\beta_1}^i$ corresponds to word sequence of the $i^{th}$ widget.

Further, the processor 202 is configured to generate a global word dictionary including all the words from the visited Web pages in the online visitor's journey as well as the 'm' widgets in the widget bank. The global word dictionary may be represented as follows:

$$\overline{\omega}_{global} = \overline{\omega}_{journey} \cup \overline{\omega}_{widget}^1 \cup \overline{\omega}_{widget}^2 \ldots \cup \overline{\omega}_{widget}^m$$

From the global word dictionary $\overline{\omega}_{global}$, the processor 202 is configured to determine mean of the word lengths i.e. $\mu_{global}$, and a standard deviation of the word lengths, i.e., $\sigma_{global}$.

Further, the processor 202 is configured to create an ESN reservoir $\mathcal{R}_{journey}$ based on the mean $\mu_{global}$ and the standard deviation $\sigma_{global}$. In an illustrative example, the ESN reservoir $\mathcal{R}_{journey}$ includes a plurality of sigmoidal neurons (for example, 100 sigmoidal neurons).

In an embodiment, the neurons in the ESN reservoir $\mathcal{R}_{journey}$ are configured to receive inputs from $\eta_{IP}$ input units, where $\eta_{IP}$ input units are computed (by the processor 202) using the mean $\mu_{global}$ and the standard deviation $\sigma_{global}$ as depicted in equation (3):

$$\eta_{IP} = \mu_{global} + 2\sigma_{global} \quad (3)$$

Furthermore, in an embodiment, the processor 202 is configured to create 'm' identical clones of the ESN reservoir $\mathcal{R}_{journey}$, where each clone is configured to represent at least one widget from among the 'm' widgets in the widget bank. Moreover, the clones (denoted by ($\mathcal{R}_1, \mathcal{R}_1, \ldots \mathcal{R}_m$)) may be identical in terms of synaptic weights as well as neuron parameters.

In an example scenario, if a length of a number of characters in a word is less that $\eta_{IP}$, then no input is provided to remaining neurons in that point of time. Similarly, if the number of characters in the word is longer or greater than $\eta_{IP}$, then only the first $\eta_{IP}$ characters are sent as input to the ESN reservoir $\mathcal{R}_{journey}$.

Accordingly, a concatenated input sequence of the input text $\overline{\omega}_{journey}$, is provided to the ESN reservoir $\mathcal{R}_{journey}$, one word at a time and a final dynamic state of the ESN reservoir $\mathcal{R}_{journey}$ represented by $\chi_{journey}^{final}$ is recorded. Similarly, word sequence of input widgets $\overline{\omega}_{widget}^i$ are provided to the ESN reservoir $\mathcal{R}_{journey}$ and a final state of the ESN reservoir $\mathcal{R}_{journey}$, represented by $\chi_i^{final}$ for i=1, 2, 3 . . . m, is recorded.

Based on the final states obtained from the input text (or text from the online visitor's journey, more particularly text from the Web pages visited by the online visitor) $\chi_{journey}^{final}$ and the final state of the ESN reservoir $\chi_i^{final}$ a correlation between each widget and content of Web pages is computed by the processor 202 of the apparatus 200.

The computation of correlation between each widget and content of Web pages is further explained with reference to FIG. 7.

Figure 7:
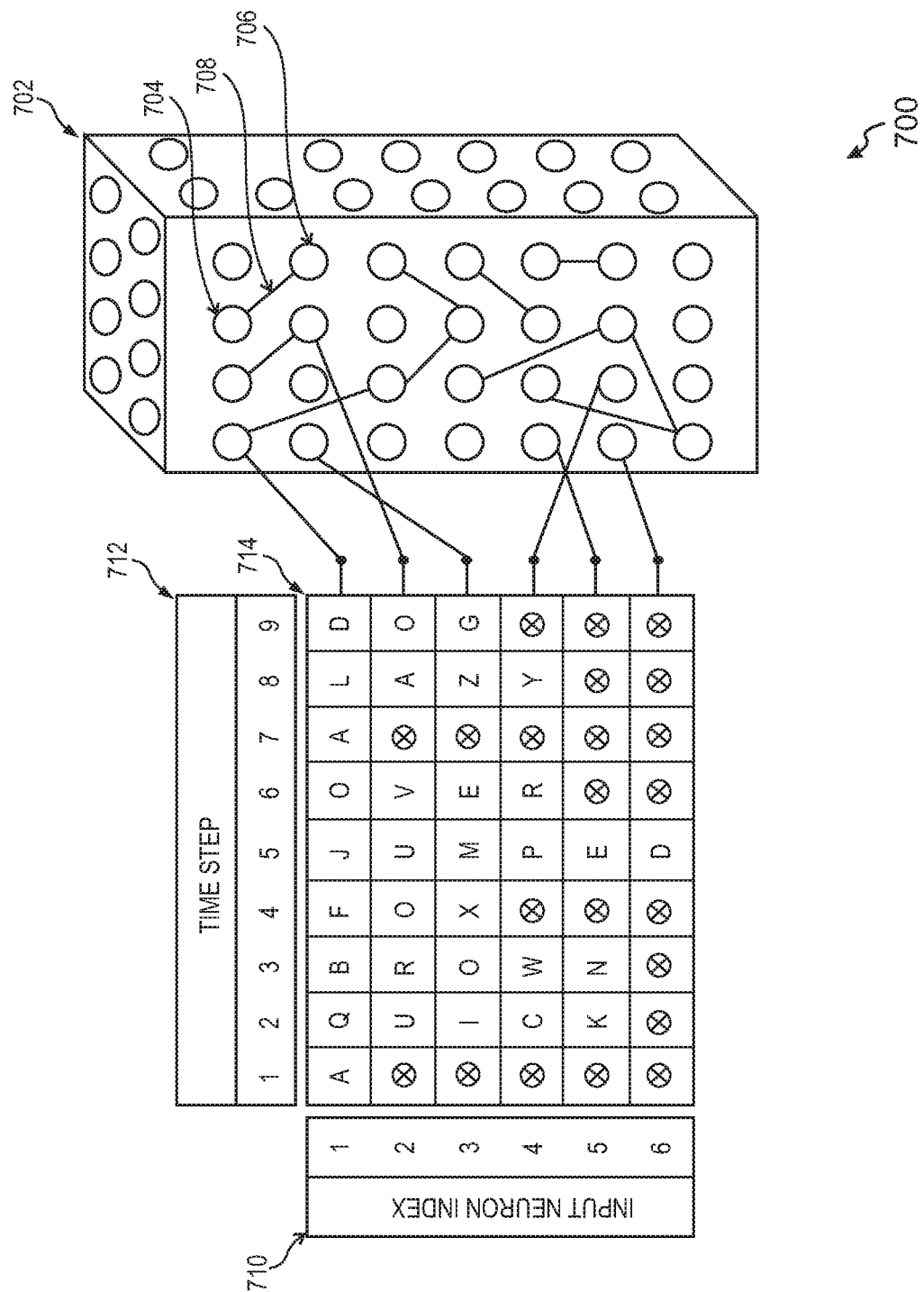
FIG. 7 shows an example representation for illustrating a provisioning a portion of Web page content as an input to an ESN reservoir, in accordance with an embodiment of the invention.

FIG. 7 shows an example representation 700 for illustrating a provisioning a portion of Web page content as an input to an ESN reservoir 702, in accordance with an embodiment of the invention.

The ESN reservoir 702 is exemplarily depicted to include a plurality of neurons, such as neurons 704, 706, and the like. The neurons are sparsely connected (i.e. some neurons are connected to each, whereas some neurons are not connected with each other) with each other via synapses, such as a synapse 708, connecting the neurons 704 and 708.

As explained above, a global dictionary is first configured by aggregating all words in the Web pages visited so far and the words included in the widgets of the widget bank. The mean and standard deviation of the words lengths are then computed (based on equation (3) provided above) to determine a number of input units (say 'n') to be provided to the ESN reservoir 702 at each input entry. In FIG. 7, the chosen value of 'n' is depicted to be six (as depicted by block 710 associated with the text 'input neuron index'). Accordingly, at each time step, input to six neurons in the ESN reservoir 702 may be provided.

In an illustrative example, a portion of Web page content to be provided as input to the ESN reservoir 702 includes the text 'A QUICK BROWN FOX JUMPED OVER A LAZY DOG'. The sequence of words starting from the first word until the last word in the input text (i.e., starting from first letter 'A' to the last word 'DOG') is provided to the ESN reservoir 702 with each word provided at one time instance, i.e., at one time step. The time steps for providing input of a word (such as 'A', 'Quick', 'Brown' etc.) is depicted exemplarily by block 712 associated with the text 'time step'). The example representation 700 further depicts a block 714 showing an ordering of words input sequence arranged as per time step for provisioning words to the ESN reservoir 702.

Further, as explained above, if a length of a number of characters in a word is less than 'n' then no input is provided to remaining neurons in that point of time. Similarly, if the number of characters in the word is longer or greater than 'n', then only the first 'n' characters are sent as input to the ESN reservoir 702. For example, the first word in the input sequence is 'A'. Because a number of characters in the first word is less than six, then no input is provided to remaining neurons (i.e. five neurons) at that point in time, as exemplarily depicted by crosses in the block 714. Similarly, the other words in the input sequence are associated with crosses (or no input to neurons) if the number of characters is less than six.

Each word in the input sequence is provided to the ESN reservoir 702, such that at the most six neurons receive a character input at each time step. A state of the ESN reservoir 702 subsequent to the provisioning of the input sequence is then compared with a final state of similar ESN reservoirs (i.e. reservoirs identical in terms of synaptic weights as well as neuron parameters) upon provisioning of content of respective widgets. A correlation score may then be computed by comparing the linear readouts of the final state of the ESN reservoir 702 with the final states of the ESN reservoirs corresponding to each widget. The widgets may then be rank ordered and top 'k' widgets with highest correlation values selected by the processor 202 and provisioned to the online visitor. Moreover, the top 'k' widgets are provisioned to the online visitor at an appropriate point in time in the ongoing customer journey.

It is noted that a key benefit of using an ESN reservoir for computing correlation scores is that an arbitrary length journey can be compressed into a fixed number of output dimensions (text from long journeys, as well as short text corresponding to widgets may all be compressed into predetermined dimension, such as 100 dimensions for example, which corresponds to the final state of the 100 neuron reservoir). This is especially beneficial when comparing two arbitrary length sequences against one another.

A method for dynamically selecting content for an online visitor is explained with reference to FIG. 8.

Figure 8:
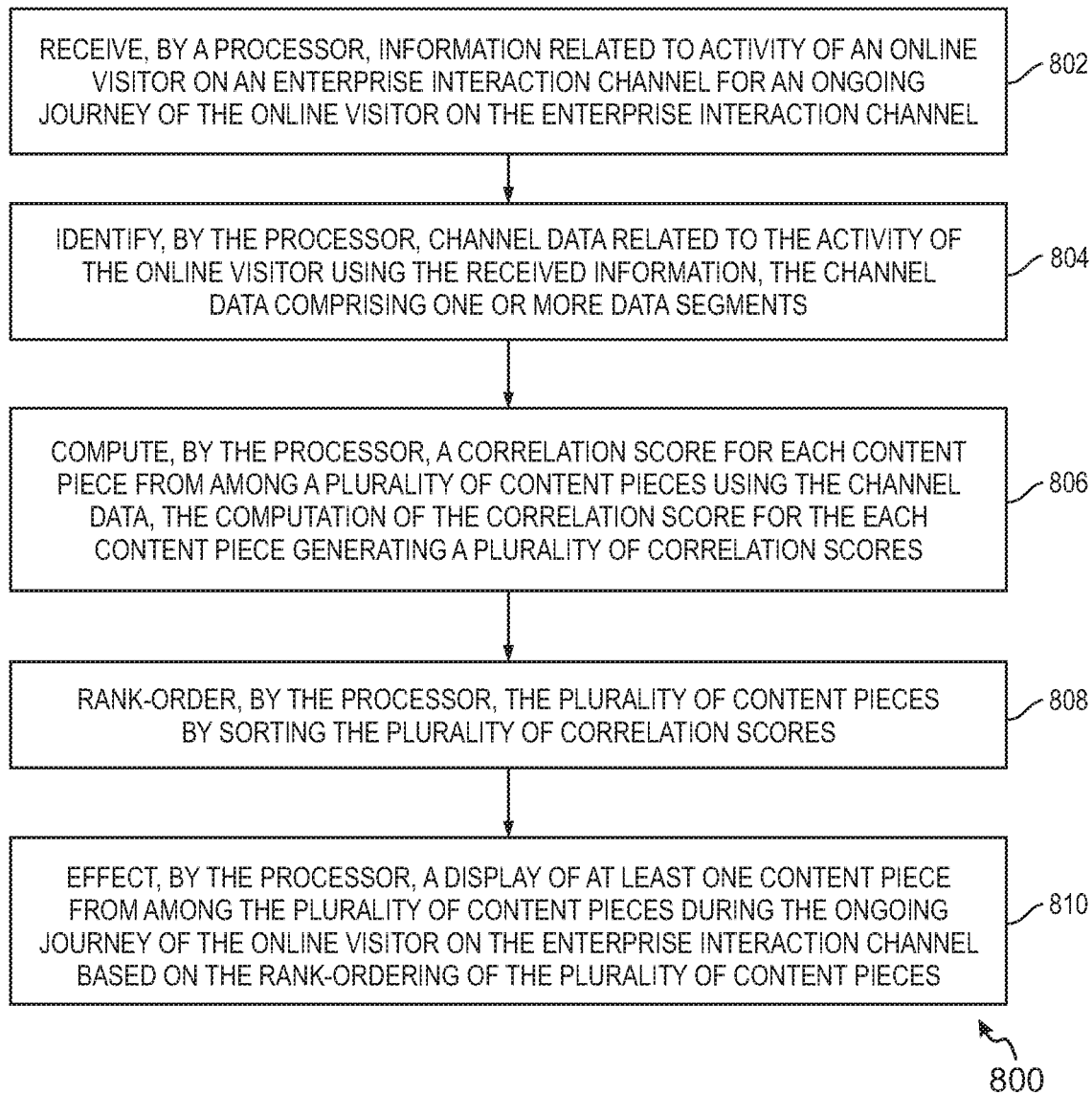
FIG. 8 is an example flow diagram of a method for dynamically selecting content for an online visitor, in accordance with an embodiment of the invention.

FIG. 8 is a flow diagram of an example method 800 for dynamically selecting content for online visitors, in accordance with an embodiment of the invention. The method 800 depicted in the flow diagram may be executed by, for example, the apparatus 200 explained with reference to FIGS. 1 to 7. Operations of the flowchart, and combinations of operation in the flowchart, may be implemented by, for example, hardware, firmware, a processor, circuitry, and/or a different device associated with the execution of software that includes one or more computer program instructions. The operations of the method 800 are described herein with help of the apparatus 200. For example, one or more operations corresponding to the method 800 may be executed by a processor, such as the processor 202 of the apparatus 200. Although the one or more operations are explained herein to be executed by the processor alone, it is understood that the processor is associated with a memory, such as the memory 204 of the apparatus 200, which is configured to store machine executable instructions for facilitating the execution of the one or more operations. The operations of the method 800 can be described and/or practiced by using an apparatus other than the apparatus 200. The method 800 starts at operation 802.

At operation 802 of the method 800, information related to activity of an online visitor on an enterprise interaction channel is received by a processor, such as the processor 202 explained with reference to FIG. 2. The activity corresponds to an ongoing journey of the online visitor on the enterprise interaction channel. Some non-exhaustive examples of an enterprise interaction channel may include a Web channel, a social channel, a native application channel, and the like. In an illustrative example, an online visitor may visit a Website, i.e. the Web channel associated with an enterprise for learning about products and/or services associated with the enterprise. In such a scenario, the received information related to activity of the online visitor may include information, such as information related to a current Web page that the online visitor is accessing, previous Web pages visited, time spent on a Web page, search terms used, and the like. In another illustrative example, an online visitor may visit a native mobile application associated with an enterprise for performing a task, such as paying a bill amount, making a purchase transaction, etc. In such a scenario, the received information related to activity of the online visitor may include information, such as information related to a menu option that the online visitor is accessing, links clicked, images accessed, search terms used, and the like.

At operation 804 of the method 800, channel data related to the activity of the online visitor is identified by the processor using the received information. For example, if the received information corresponds to online visitor's Website activity information, then the Web pages visited by the online visitor during the online journey may be identified. In such a scenario, the channel data identified for such a visitor journey may correspond to data (for example, textual data) corresponding to Web page content of the Web pages visited by the online visitor during the ongoing journey on the enterprise Website. In another illustrative example, if the received information corresponds to online visitor's activity on social media forum, then UIs corresponding to the social media forum visited by the online visitor during the online journey may be identified. In such a scenario, the channel data identified for such a visitor journey may correspond to data (for example, textual data) corresponding to UIs visited by the online visitor during the ongoing journey on the enterprise social media forum.

It is noted that channel data may include one or more data segments. For example, if the channel data corresponds to overall content of all Web pages visited by the online visitor, then each data segment may correspond to content related to one Web page visited by the online visitor. Similarly, if the channel data corresponds to overall textual content of UIs of the native mobile application accessed by the online visitor, then each data segment may correspond to textual content of one UI from among the several UIs accessed by the online visitor.

In an embodiment, upon receiving information related to an online visitor's journey, all possible content (also interchangeably referred to herein as 'content pieces') that may be offered to the online visitor may be retrieved from a storage location, such as the memory 204. For example, several content pieces such as widgets (or pop-ups) including textual content related to advertisements, promotional offers, discount coupons, news snippets, frequently asked questions (FAQs), and the like, may be retrieved.

At operation 806 of the method 800, a correlation score is computed by the processor for each content piece from among the plurality of content pieces. The correlation score for each content piece is computed using the channel data. The computation of the correlation score for each content piece generates a plurality of correlation scores. The correlation score is indicative of a measure of correlation between content corresponding to a respective content piece and content corresponding to a data segment. The correlation score for each content piece may be computed as a cosine similarity score (such as the page-wise cosine similarity score), a cumulative cosine similarity score or using ESN reservoirs as explained with reference to FIGS. 4 to 7 and is not explained again herein.

At operation 808 of the method 800, the plurality of content pieces are rank-ordered by the processor by sorting the plurality of correlation scores. For example, the correlation scores may be sorted in a descending order and rank-ordered from top to bottom. At operation 810 of the method 800, a display of at least one content piece from among the plurality of content pieces is effected by the processor during the ongoing journey of the online visitor on the enterprise interaction channel. The display of the at least one content piece is effected based on the rank-ordering of the plurality of content pieces. For example, the top 'k' widgets may be selected based on the rank associated with each widget. In an illustrative example, the value of 'k' may be chosen to be one. Accordingly, the top ranking widget may be displayed to the visitor on the Website. For example, for an online visitor visiting a Website to purchase a laptop, a widget including static content related to an equated monthly installment (EMI) scheme for purchasing laptops may be displayed to the online visitor on the Website. Similarly, a widget including advertisement content related to a promotional offer or content related to a Web-link showcasing laptop brand comparisons, laptop model reviews, and the like, may also be displayed to the online visitor. In some embodiments, for an online visitor wishing to resolve a query, a chat widget offering a chat interaction with a human agent or a virtual agent, or alternatively, frequently asked questions (FAQ) page content may be displayed to the online visitor. It is understood that the value of 'k' for selecting k top widgets is described herein to be 'one' for illustration purposes and it is understood that the value of k may be chosen to be any number greater than one, and the display provided to the online visitor may be appended/modified, accordingly.

Although the method 800 is explained with reference to a single online visitor visiting a Website, the method 800 may be extended to dynamically select content for a plurality of online visitors visiting various interaction channels, such as Websites, native mobile applications, social media etc. Furthermore, the dynamically selected content may be chosen from among varied types of content pieces, such as those related to advertisements, FAQ, new snippets, chat assistance pop-ups, etc.

Another method for dynamically selecting content for an online visitor is explained with reference to FIG. 9.

Figure 9:
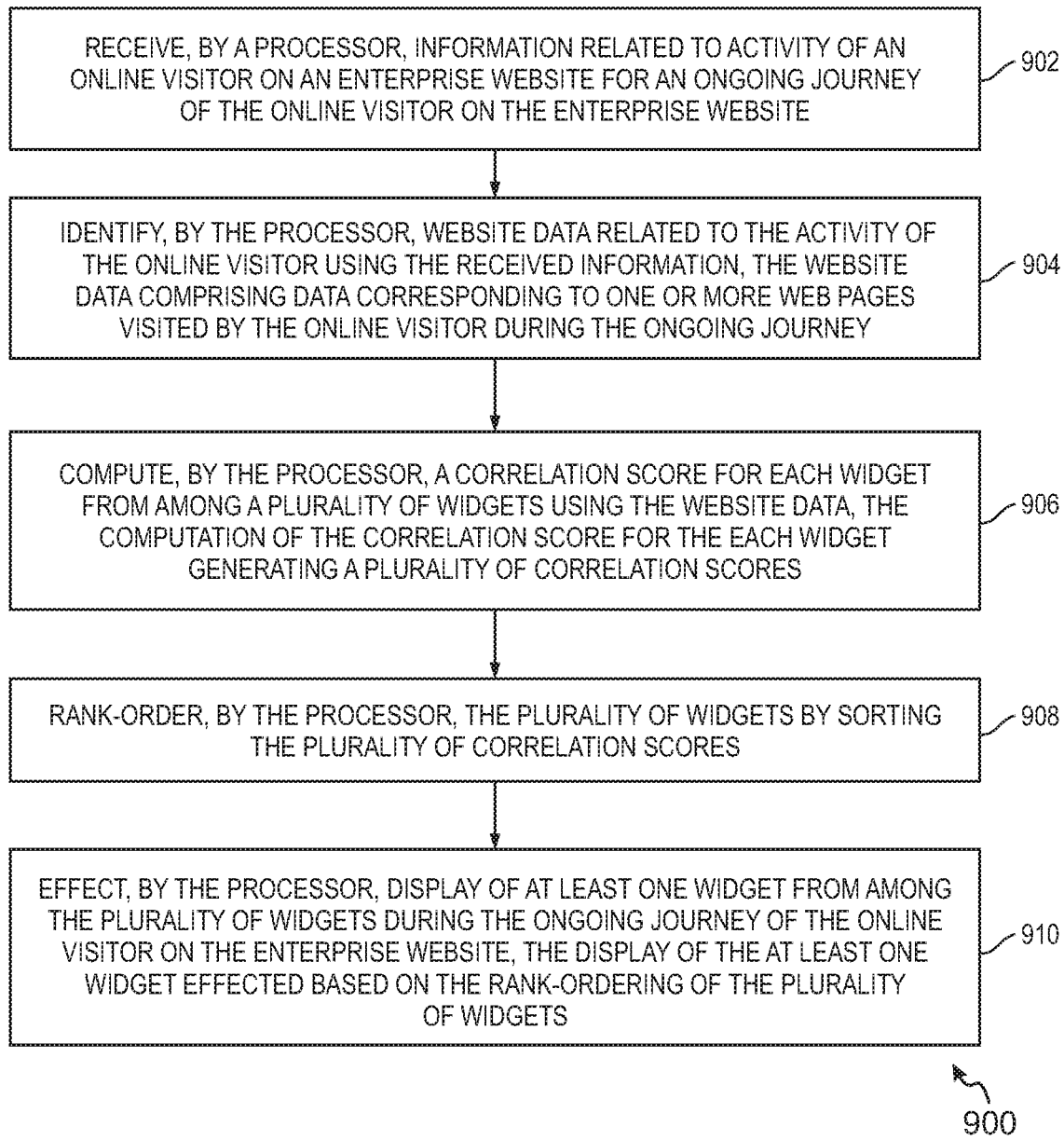
FIG. 9 is an example flow diagram of a method for dynamically selecting content for an online visitor, in accordance with another embodiment of the invention.

FIG. 9 is a flow diagram of an example method 900 for dynamically selecting content for online visitors, in accordance with another embodiment of the invention. The method 900 depicted in the flow diagram may be executed by, for example, the apparatus 200 explained with reference to FIGS. 2 to 7. Operations of the flowchart, and combinations of operation in the flowchart, may be implemented by, for example, hardware, firmware, a processor, circuitry, and/or a different device associated with the execution of software that includes one or more computer program instructions. The method 900 starts at operation 902.

At operation 902 of the method 900, information related to activity of an online visitor on an enterprise Website is received by a processor, such as the processor 202 of the apparatus 200 explained with reference to FIG. 2. The activity corresponds to an ongoing journey of the online visitor on the enterprise Website is received.

At operation 904 of the method 900, Website data related to the activity of the online visitor using the received information is identified by the processor. The Website data includes data corresponding to one or more Web pages visited by the online visitor during the ongoing journey.

At operation 906 of the method 900, a correlation score is computed by the processor for each widget from among the plurality of widgets. The correlation score is computed using the Website data. The computation of the correlation score for each widget generates a plurality of correlation scores.

At operation 908 of the method 900, the plurality of widgets are rank-ordered by the processor by sorting the plurality of correlation scores.

At operation 910 of the method 900, a display of at least one widget from among the plurality of widgets is effected by the processor during the ongoing journey of the online visitor on the enterprise Website. The display of the at least one widget is effected based on the rank-ordering of the plurality of widgets.

Various embodiments disclosed herein provide numerous advantages. The techniques disclosed herein suggest techniques for dynamically selecting content that is customized to an individual online visitor's current behavior or preference. Moreover, dynamic selection of relevant content can be extended to scenarios, where sufficient historical visitor interaction data is absent. This is especially useful for first time online visitors to enterprise interaction channels as appropriate content may be provided to the visitors without the need to access any historical data for predicting intent of the visitors. To that effect, three unsupervised learning based approaches are disclosed that can be used to dynamically determine relevant content based on an individual visitor's journey across an enterprise interaction channel. More specifically, the individual pieces of content (for example, widgets, advertisements etc.) are ranked based on their correlation with the content of the interaction channel at any arbitrary point in time in the online visitor's journey and the most relevant content-pieces (for example, higher ranking content pieces) are provisioned to the online visitor. Such provisioning of the relevant content to the online visitor at appropriate point in time in the ongoing visitor journey provides a personalized experience to the online visitor, thereby improving an online browsing experience of the online visitor and increasing chances of a sale.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry, and/or in Digital Signal Processor (DSP) circuitry).

Particularly, the apparatus 200, the processor 202, the memory 204, the I/O module 206 and the communication interface 208 may be enabled using software and/or using transistors, logic gates, and electrical circuits (for example, integrated circuit circuitry such as ASIC circuitry). Various embodiments of the present technology may include one or more computer programs stored or otherwise embodied on a computer-readable medium, wherein the computer programs are configured to cause a processor or computer to perform one or more operations (for example, operations explained herein with reference to FIGS. 8 and 9). A computer-readable medium storing, embodying, or encoded with a computer program, or similar language, may be embodied as a tangible data storage device storing one or more software programs that are configured to cause a processor or a computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the technology has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method, comprising:

receiving, by a processor, information related to activity of an online visitor on an enterprise interaction channel for an ongoing journey of the online visitor on the enterprise interaction channel;

identifying, by the processor, channel data related to the activity of the online visitor using the received information, the channel data comprising one or more data segments;

computing by the processor, for the each content piece from among a plurality of content pieces using the channel data, the computation of the correlation score for the each content piece generating a plurality of correlation scores, wherein the each content piece may be provided to the online visitor during the ongoing journey on the enterprise interaction channel;

computing by the processor, for the each content piece, a cumulative cosine similarity score indicative of a measure of correlation between content corresponding to a respective content piece and cumulative content corresponding to the one or more data segments, wherein the respective cumulative cosine similarity score computed for the each content piece configures the correlation score for the each content piece, wherein computing the cumulative cosine similarity score for a content piece compises:

identifying a list of elements common to content of the content piece and the cumulative content corresponding to the one or more data segments;

computing a cumulative term vector based on a number of occurrences of each element from among the list of elements in the cumulative content;

computing a second vector based on a number of occurences of the each element in the content of the content piece;

wherein the cumulative cosine similarity score is computed, at least in part, by determining a cosine component of an angle between the cumulative term vector and the second vector;

rank-ordering, by the processor, the plurality of content pieces by sorting a plurality of correlation scores; and based on the rank-ordering of the plurality of content pieces, effecting, by the processor, display of at least one content piece from among the plurality of content pieces during the ongoing journey of the online visitor on the enterprise interaction channel.

2. The method of claim 1, further comprising:

computing by the processor, for the each content piece, a cosine similarity score corresponding to each data segment from among the one or more data segments to generate one or more cosine similarity scores for the each content piece, wherein each cosine similarity score indicates a measure of correlation between the content corresponding to the respective content piece and content corresponding to a data segment from among the one or more data segments.

3. The method of claim 2, wherein computing the cosine similarity score comprises:

identifying a list of elements common to the content of the respective content piece and the content of the data segment;

computing a first vector based on a number of occurrences of each element from among the list of elements in the content of the data segment; and computing a second vector based on a number of occurrences of the each element in the content of the respective content piece;

wherein the each cosine similarity score is computed, at least in part, by determining a cosine component of an angle between the first vector and the second vector.

4. The method of claim 3, further comprising:

for the each content piece, computing, by the processor, an average value of the respective one or more cosine similarity scores, the average value of the respective one or more cosine similarity scores configuring the correlation score for the each content piece.

5. The method of claim 1, further comprising:

computing the correlation score for the each content piece using a reservoir computing framework.

6. The method of claim 5, wherein the reservoir computing framework corresponds to an Echo state network (ESN).

7. The method of claim 6, further comprising:

generating, by the processor, a primary ESN reservoir comprising a plurality of neurons, wherein one or more neurons from among the plurality of neurons are interconnected randomly or connected to each other based on a predefined probability distribution function;

providing, by the processor, a first input comprising a sequence of elements configuring content corresponding to the one or more data segments; and recording, by the processor, a state of the primary ESN reservoir subsequent to provisioning of the first input to the primary ESN reservoir, wherein the correlation score for the each content piece is computed, at least in part, based on the state of the primary ESN reservoir.

8. The method of claim 7, further comprising:

generating, by the processor, a plurality of secondary ESN reservoirs, each secondary ESN reservoir from among the plurality of secondary ESN reservoirs configured to be a clone of the primary ESN reservoir;

providing to the each secondary ESN reservoir, by the processor, a respective second input comprising a sequence of elements configuring content corresponding to one content piece from among the plurality of content pieces;

recording, by the processor, a final state of the each secondary ESN reservoir subsequent to provisioning of the respective second input; and comparing, by the processor, the final state of the each secondary ESN reservoir to the state of the primary ESN reservoir, wherein the correlation score for the each content piece is computed based on the comparison of the final state of the respective secondary ESN reservoir with the state of the primary ESN reservoir.

9. The method of claim 8, further comprising:

generating, by the processor, a set comprising a plurality of elements, the plurality of elements comprising elements corresponding to the one or more data segments and elements corresponding to the plurality of content pieces;

computing, by the processor, a standard deviation value and a mean value from respective lengths of the plurality of elements; and determining, by the processor, an threshold input length to each ESN reservoir based on the standard deviation value and the mean value, wherein the threshold input length to each ESN reservoir is a threshold established for each element used in the first input and in the second input, where each element used in the first input and the second input, whose characters exceed the threshold input length is truncated such that a first number of characters equal to the threshold input length are sent to the ESN reservoir and used as the first input and the second input.

10. The method of claim 1, further comprising:
displaying a highest ranking content piece from among the plurality of content pieces to the online visitor during the ongoing journey on the enterprise interaction channel.

11. The method of claim 1, wherein the plurality of content pieces comprises one or more widgets displaying content related to at least one of an advertisement, a promotional offer, a discount offer, an offer for agent assistance, a news story, and a frequently asked question (FAQ).

12. The method of claim 1, wherein the enterprise interaction channel corresponds to a Website and the each data segment corresponds to a Web page visited by the online visitor during the ongoing journey on the enterprise interaction channel.

13. An apparatus, comprising:
at least one processor; and
a memory having stored therein machine executable instructions, that when executed by the at least one processor, cause the apparatus to:
  receive information related to activity of an online visitor on an enterprise interaction channel for an ongoing journey of the online visitor on the enterprise interaction channel;
  identify channel data related to the activity of the online visitor using the received information, the channel data comprising one or more data segments;
  compute a correlation score for each contant piece from among the plurality of content pieces using the channel data, the computation of the correlation score for the each content piece generating a plurality of correlation scores, wherein the each content piece may be provided to the online visitor during the ongoing journey on the enterprise interaction channel;
  compute for the each content piece, a cumulative cosine similarity score indicative of a measure of correlation between content corresponding to a respective content piece and cumlative content corresponding to the one or more data segments, wherein the respective cumulative cosine similarity score computed for the each content piece configures the correlation score for the each content piece, wherein computing the cumulative cosine similarity score for a content piece comprises:
    identify a list of elements common to content of the content piece and the cumulative content corresponding to the one or more data segments;
    compute a cumulative term vector based on a number of occurrences of each element from among the list of elements in the cumulative content;
    compute a second vector based on a number of occurrences of the each element of the content piece,
    wherein the cumulative cosine similarity score is computed, at least in part, by determining a cosine component of an angle between the cumulative term vector and the second vector;
  rank-order the plurality of content pieces by sorting the plurality of correlation scores; and
  based on the rank-ordering of the plurality of content pieces, effect display of at least one content piece from among the plurality of content pieces during the ongoing journey of the online visitor on the enterprise interaction channel.

14. The apparatus of claim 13, wherein the apparatus is further caused to:
compute for the each content piece, a cosine similarity score corresponding to each data segment from among the one or more data segments to generate one or more cosine similarity scores for the each content piece, wherein each cosine similarity score indicates a measure of correlation between the content corresponding to the respective content piece and content corresponding to a data segment from among the one or more data segments.

15. The apparatus of claim 14, wherein for computing the each cosine similarity score, the apparatus is caused to:
identify a list of elements common to the content of the respective content piece and the content of the data segment;
compute a first vector based on a number of occurrences of each element from among the list of elements in the content of the data segment; and
compute a second vector based on a number of occurrences of the each element in the content of the respective content piece,
wherein the each cosine similarity score is computed, at least in part, by determining a cosine component of an angle between the first vector and the second vector.

16. The apparatus of claim 15, wherein the apparatus is further caused to:
for the each content piece, compute an average value of the respective one or more cosine similarity scores, the average value of the respective one or more cosine similarity scores configuring the correlation score for the each content piece.

17. The apparatus of claim 13, wherein the correlation score for the each content piece is computed using an Echo state network (ESN) framework.

18. The apparatus of claim 17, wherein the apparatus is further caused to:
generate a primary ESN reservoir comprising a plurality of neurons, one or more neurons from among the plurality of neurons interconnected randomly or connected to each other based on a predefined probability distribution function;
provide a first input comprising a sequence of elements configuring content corresponding to the one or more data segments; and
record a state of the primary ESN reservoir subsequent to provisioning of the first input to the primary ESN reservoir, wherein the correlation score for the each content piece is computed, at least in part, based on the state of the primary ESN reservoir.

19. The apparatus of claim 18, wherein the apparatus is further caused to:
generate a plurality of secondary ESN reservoirs, each secondary ESN reservoir from among the plurality of secondary ESN reservoirs configured to be a clone of the primary ESN reservoir;
provide to the each secondary ESN reservoir, a respective second input comprising a sequence of elements configuring content corresponding to one content piece from among the plurality of content pieces;

record a final state of the each secondary ESN reservoir subsequent to provisioning of the respective second input; and compare the final state of the each secondary ESN reservoir to the state of the primary ESN reservoir, wherein the correlation score for the each content piece is computed based on the comparison of the final state of the respective secondary ESN reservoir with the state of the primary ESN reservoir.

20. The apparatus of claim 19, wherein the apparatus is further caused to:

generate a set comprising a plurality of elements, the plurality of elements comprising elements corresponding to the one or more data segments and elements corresponding to the plurality of content pieces;

compute a standard deviation value and a mean value from respective lengths of the plurality of elements; and determine an threshold input length to each ESN reservoir based on the standard deviation value and the mean value, wherein the threshold input length to each ESN reservoir is a threshold established for each element used in the first input and in the second input, where each element used in the first input and the second input, whose characters exceed the threshold input length is truncated such that a first number of characters equal to the threshold input length are sent to the ESN reservoir and used as the first input and the second input.

21. The apparatus of claim 13, wherein the apparatus is further caused to:

display a highest ranking content piece from among the plurality of content pieces to the online visitor during the ongoing journey on the enterprise interaction channel.

22. An apparatus, comprising:

at least one communication interface configured to receive information related to activity of an online visitor on an enterprise Website for an ongoing journey of the online visitor on the enterprise Website;

at least one processor; and a memory having stored therein machine executable instructions, that when executed by the at least one processor, cause the apparatus to:

identify Website data related to the activity of the online visitor using the received information, the Website data comprising data corresponding to one or more Web pages visited by the online visitor during the ongoing journey;

compute, for each widget from among a plurality of widgets using the Website data, the computation of the correlation score for the each widget generating a plurality of correlation scores, wherein the each widget may be provided to the online visitor during the ongoing journey on the enterprise Website;

compute, for each widget, a cumulative cosine similarity score indicative of a measure of correlation between content corresponding to a respective widget and cumulative content corresponding to the one ot more Web pages, wherein for computing the cumulative cosine similarity score for a content piece, the apparatus is caused to:

identify a list of words common to content of the widget and the cumulative content corresponding to the one or more Web pages;

compute a cumulative term vector based on a number of occurrences of each word from among the list of words in the cumulative content;

compute a second vector based on a number of occurrences of the each word in the content of the widget, wherein the cumulative cosine similarity score is computed, at least in part, by determining a cosine component of an angle between the cumulative term vector and the second vector rank-order the plurality of widgets by sorting a plurality of correlation scores; and based on the rank-ordering of the plurality of widgets, effect display of at least one widget from among the plurality of widgets during the ongoing journey of the online visitor on the enterprise Website.

23. The apparatus of claim 22, wherein the apparatus is further caused to:

compute for the each widget, a cosine similarity score corresponding to data for each Web page from among the one or more Web pages to generate one or more cosine similarity scores for the each widget, wherein each cosine similarity score indicates a measure of correlation between the content corresponding to the respective widget and content corresponding to a Web page from among the one or more Web pages.

24. The apparatus of claim 23, wherein for computing the each cosine similarity score, the apparatus is caused to:

identify a list of words common to the content of the respective widget and the content of the Web page;

compute a first vector based on a number of occurrences of each word from among the list of words in the content of the Web page; and compute a second vector based on a number of occurrences of the each word in the content of the respective widget, wherein the each cosine similarity score is computed, at least in part, by determining a cosine component of an angle between the first vector and the second vector.

25. The apparatus of claim 24, wherein the apparatus is further caused to:

for the each widget, compute an average value of the respective one or more cosine similarity scores, the average value of the respective one or more cosine similarity scores configuring the correlation score for the each widget.

26. The apparatus of claim 22, wherein the apparatus is further caused to:

generate a primary echo state network (ESN) reservoir comprising a plurality of neurons, one or more neurons from among the plurality of neurons interconnected randomly or connected to each other based on a predefined probability distribution function;

provide a first input comprising a sequence of words configuring content corresponding to the one or more Web pages; and record a state of the primary ESN reservoir subsequent to provisioning of the first input to the primary ESN reservoir, wherein the correlation score for the each widget is computed, at least in part, based on the state of the primary ESN reservoir.

27. The apparatus of claim 26, wherein the apparatus is further caused to:

generate a plurality of secondary ESN reservoirs, each secondary ESN reservoir from among the plurality of secondary ESN reservoirs configured to be a clone of the primary ESN reservoir;

provide to the each secondary ESN reservoir, a respective second input comprising a sequence of words configuring content corresponding to one widget from among the plurality of widgets;

record a final state of the each secondary ESN reservoir subsequent to provisioning of the respective second input; and compare the final state of the each secondary ESN reservoir to the state of the primary ESN reservoir, wherein the correlation score for the each widget is computed based on the comparison of the final state of the respective secondary ESN reservoir with the state of the primary ESN reservoir.

28. The apparatus of claim 27, wherein the apparatus is further caused to:

generate a set comprising a plurality of words, the plurality of words comprising words corresponding to the one or more Web pages and words corresponding to the plurality of widgets;

compute a standard deviation value and a mean value from respective lengths of the plurality of words; and determine an threshold input length to each ESN reservoir based on the standard deviation value and the mean value, wherein the threshold input length to each ESN reservoir is a threshold established for each element used in the first input and in the second input, where each element used in the first input and the second input, whose characters exceed the threshold input length is truncated such that a first number of characters equal to the threshold input length are sent to the ESN reservoir and used as the first input and the second input.

29. The apparatus of claim 22, wherein the apparatus is further caused to:

display a highest ranking widget from among the plurality of widgets to the online visitor during the ongoing journey on the enterprise Website.

30. The apparatus of claim 22, wherein the at least one widget from among the plurality of widgets is configured to display advertisement content or content offering agent chat assistance to the online visitor.

* * * * *